United States Patent [19]

Josten et al.

[11] 4,170,611

[45] Oct. 9, 1979

[54] PROCESS FOR PREPARING BONDING AGENTS FOR LIGHT-COLORED WEATHERPROOF WOOD MATERIALS

[75] Inventors: Friedrich Josten; Martin Cherubim, both of Moers; Rainer Striso, Kamp-Lintfort, all of Fed. Rep. of Germany

[73] Assignee: Deutsche Texaco Aktiengesellschaft, Hamburg, Fed. Rep. of Germany

[21] Appl. No.: 757,111

[22] Filed: Jan. 5, 1977

[30] Foreign Application Priority Data

Jan. 8, 1976 [DE] Fed. Rep. of Germany ....... 2600435

[51] Int. Cl.² .............................................. C08L 61/28
[52] U.S. Cl. ..................................... 525/494; 525/497
[58] Field of Search ................................ 260/828, 839

[56] References Cited

U.S. PATENT DOCUMENTS

| | | | |
|---|---|---|---|
| 2,364,900 | 12/1944 | Hessel et al. | 260/828 |
| 2,576,735 | 10/1948 | Vogelsang | 260/828 |
| 4,011,280 | 3/1977 | Josten et al. | 260/828 |

FOREIGN PATENT DOCUMENTS 515467 12/1939 Canada ..................................... 260/828
2264288 9/1973 Fed. Rep. of Germany .

OTHER PUBLICATIONS

Kirk-Othmer, "Encyclopedia of Chemical Technology", vol. 2 (1964), at p. 227.

*Primary Examiner*—Lorenzo B. Hayes
*Assistant Examiner*—Amelia B. Yarborough
*Attorney, Agent, or Firm*—Thomas H. Whaley; Carl G. Ries; Robert A. Kulason

[57] ABSTRACT

A process for preparing bonding agents for light-colored weatherproof wood materials, based on alkali-condensed phenol-formaldehyde mixed condensates.

6 Claims, No Drawings

PROCESS FOR PREPARING BONDING AGENTS FOR LIGHT-COLORED WEATHERPROOF WOOD MATERIALS

BACKGROUND OF INVENTION

Urea-formaldehyde condensation resin solutions are used in large quantities as bonding agents for manufacturing wood materials such as wood chipboards, wood fiberboards, plywood, etc. Wood materials bonded with urea resins have the advantage over those bonded with phenolic resin that they can be manufactured colorless and at a favorable price, but on the other hand they have the big disadvantage of only limited waterproofing and completely insufficient weatherproofing, and in addition continuously set free formaldehyde. Because of these disadvantages, the range of application of wood materials bonded with urea resin is limited.

However, neither do melamine-formaldehyde or acetone-formaldehyde condensation resin solutions produce waterproof and weatherproof wood materials.

Furthermore, wood materials manufactured using phenol-formaldehyde condensation resin solutions are darker and more expensive, but they are water and weather resistant and do not set free formaldehyde. In view of these facts, there has been extended investigation on mixed condensation directed towards strengthening the desirable characteristics of condensation resin solutions as bonding agents for wood materials, and suppressing or at least reducing the undesirable characteristics.

This has also been partly achieved. Thus in DT-PS No. 1 247 017, a urea-acetone condensation resin solution is prepared which gives wood materials improved water resistance. However, the weather resistance is insufficient. Furthermore, this resin sets free formaldehyde because of its urea content.

In DT-PS No. 2 264 288, the weather resistance is improved in that the urea-acetone-formaldehyde resins are after-condensed with phenol-formaldehyde resins, and in DT-OS No. 20 20 481, which relates to a process for preparing a weatherproof wood glue, a bonding agent for weatherproof wood materials is obtained by modifying an aminoplastic resin of melamine, urea and formaldehyde with phenol, but a corresponding urea-free resin possesses substantially better water and weather resistance. The disadvantage of formaldehyde being set free is not eliminated by the known bonding agents for weatherproof wood materials.

DESCRIPTION OF THE INVENTION

The object of the present invention is therefore to provide a bonding agent which produces light-colored wood materials possessing the weather resistance of wood materials bonded with phenolic resin, and manufactured in the complete absence of urea so that no formaldehyde is set free. This object is attained by a process characterized in that a resin solution A is prepared by condensing phenol and formaldehyde in a molar ratio of 1:1.5 to 2.5 in the presence of 0.1–1 moles of alkali, relative to phenol, to a viscosity of 10–20 sec. when measured in a 4 mm DIN beaker at 20° C. and at a solids content of 45–50 wt. %; and a resin solution B is prepared by condensing acetone and formaldehyde in a molar ratio of 1:3 to 5 in the presence of 0.01–0.15 moles of alkali, relative to acetone, to give a precondensate, then adding melamine portion-wise to the acetone-formaldehyde precondensate to a total melamine quantity such that the molar ratio of melamine to acetone lies in the range of 1:1 to 2.5, and condensing to a viscosity of 10–20 sec. when measured in a 4 mm DIN beaker at 20° C. and at a solids content of 45–50 wt. %; the two resin solutions A and B are mixed so that the phenol content of the mixture, relative to phenol plus melamine plus acetone, is 10–40 mole %, the mixture is condensed for 20–60 minutes at 70°–90° C., and is then concentrated at about 10–20 torr. pressure to a solids content of 60–65 wt. %, and a viscosity of 200–100 sec. when measured in a 4 mm DIN beaker at 20° C.

Preferably, in preparing the resin solution B, the melamine is added portion-wise to an acetone-formaldehyde precondensate having a temperature of 70°–90° C. and a pH of about 7.5–8, and condensation is effected at this temperature to a water compatibility level of at least 1:2. The pH, which has fallen to 7.5–7, is then adjusted to 8–9 by adding alkali. (The water compatibility level signifies the relative water quantity which can be added to a given quantity of resin solution without separation taking place).

In a particularly preferred embodiment of the invention, the resin solution B is condensed after adding the melamine in an acid range of pH 6–6.5 to a water compatibility level of at least 1:2, and is then adjusted to a pH of 8–9 by adding alkali after cooling. This method has the advantage over the alkaline method of being substantially faster.

The viscosity of the condensation resin solutions according to the invention is preferably adjusted to 20–100 sec. when measured in a 4 mm DIN beaker at 20° C. and at a solids content of 60–65 wt. %, so that they can be well diluted.

The gelling time of the condensation resin solutions according to the invention is about 50–60 seconds on adding 10 wt. % of ammonium chloride hardener, and thus lies within the range of known wood chipboard bonding agents.

The phenol may be added in the form of pure phenol, or as an aqueous-alkali solution, or mixed with a 37 wt. % aqueous formaldehyde solution. The phenol may evidently be replaced by other oxybenzole such as cresols or resorcin.

The formaldehyde is desirably added as a 30–40 wt. % aqueous solution. However, it may be used in the form of paraformaldehyde. Suitable condensation catalysts are alkali-reacting solutions of alkaline or alkaline earth compounds.

The acetone may be used either free from water, as an aqueous solution, or in mixture with formaldehyde. The melamine is added in solid form to the precondensate of formaldehyde and acetone (portion-wise).

The bonding agent according to the invention is clear and bright yellow. The wood materials prepared therefrom retain their natural color, are waterproof and weatherproof, and do not give off formaldehyde.

A further advantage of the condensation resin solutions according to the invention is that they may be hardened with acid accelerators. Thus, when manufacturing, for example, wood chipboard, it is unnecessary to clean the gluing apparatus and press if non-weatherproof chipboard bonded by urea resin has previously been or is subsequently to be manufactured, as this is hardened by the same hardener system.

Method of the invention is further illustrated by the following examples which, however, are not to be interpreted as limitations thereof.

EXAMPLE I

Preparation of the condensation resin solution A was accomplished by placing 94.1 grams of phenol (1 mole) and 162.2 grams of 37 wt. % aqueous formaldehyde solution (2 moles of HCHO) in a glass flask fitted with a stirrer, reflux condenser, thermometer and pH meter. The mixture of these substances was heated to 60° C., and 13.3 grams of a 50 wt. % caustic soda solution (0.17 moles) were added over two hours at 60° C. The contents of the flask were then heated over 20 minutes to 80° C. and further condensed at this temperature for a further 30 minutes. After cooling the mixture to about 20° C., the pH was adjusted to 7.7 by 50 wt. % formic acid. The viscosity was 15 sec. when measured in a 4 mm DIN beaker at 20° C., and the solids content was 47.6.

Preparation of the condensation resin solution B was accomplished by adding 677 grams of 37 wt. % aqueous formaldehyde solution (8.31 moles of HCHO), 8.4 grams (0.021 moles) of 10 wt. % caustic soda solution to a laboratory stirring apparatus such as that used for preparing the condensation resin solution A, and the mixture was heated to 60° C. Acetone in an amount of 100.5 grams (1.73 moles) were then added, whereon the temperature rises to 80° C. After condensing for five minutes at 80° C., 210.4 grams of melamine (1.67 moles) were added portion-wise. Condensation was continued at 80° C. After about 135 minutes the condensation product had a water compatibility level of 1:3.5. The pH had fallen to 7.2, and was adjusted to 8.5 by adding caustic soda.

The two condensation resin solutions A and B were mixed and after-condensed for a further 30 minutes at 80° C. The mixture was then condensed to a solids content of 63 wt. % by distilling off water under a pressure of about 12 torr. The viscosity of the condensation resin solution obtained was 43 sec. when measured in a 4 mm DIN beaker at 20° C., the gelling time at 100° C. after adding 10 wt. % of ammonium chloride hardener was 53 sec., and the water compatibility level was 1:3. The resin solution was bright yellow and clear. The mole % ratio of the phenol-melamine-acetone was 22.7:38.0:39.3.

EXAMPLE II

Condensation resin solution A is prepared in the same manner using the same quantities as in Example I.

Preparation of the condensation resin B was obtained by mixing 661.8 grams of a 37 wt. % aqueous formaldehyde solution (8.16 moles of HCHO) with 9.9 grams of 10 wt. % caustic soda solution (0.025 moles) and the resultant mixture heated to 60° C. Acetone in an amount of 118.5 grams (2.04 moles) was added to the heated mixture on which addition the temperature rose to 80° C. After condensing for five minutes at 80° C., 171.4 grams of melamine (1.36 moles) was added portion-wise. It is then condensed further at 80° C. After about 110 minutes, the condensation product had a water compatibility level of 1:3.5. The pH had fallen to 7.2 and is adjusted to 8.5 by adding caustic soda.

The two condensation resin solutions A and B were mixed and after condensed for a further 30 minutes at 80° C. The mixture was then concentrated to a solids content of 63 wt. % by distilling off water under a pressure of about 12 torr. The viscosity of the condensation resin solution obtained was 49 sec. when measured in a 4 mm DIN beaker at 20° C., the gelling time at 100° C. after adding 10 wt. % ammonium chloride hardener was 71 sec. and the water compatibility level is 1:2. The resin solution was bright yellow and clear. The mole ratio of phenol-melamine-acetone was 22.7:30.9:46.4.

EXAMPLE III

Condensation resin solution A was prepared in the same manner using the same quantities as in Example I.

Preparation of the condensation resin B was brought about by mixing 139.1 grams of acetone (2.4 moles) with 677.2 grams of a 37 wt. % aqueous formaldehyde solution (8.35 moles) and the resultant mixture was heated to 55° C. Caustic soda in an amount of 11.6 grams in the form of a 10 wt. % aqueous solution (0.03 moles) was added over a period of 30 minutes. The mixture was then heated over 20 minutes to 80° C. and 119.7 grams of melamine (0.95 moles) was then added portion-wise over a period of 15 minutes. After 90 minutes the water compatibility level is 1:2.5. It was then left to cool to about 20° C. over a period of 20 minutes. The resin solution now had a pH of 8.4 and a water compatibility level of 1:4.7. The mole % ratio of meleamine: acetone is 28.6:71.4. The two condensation resin solutions A and B were mixed and after-condensed for a further 30 minutes at 80° C. The mixture was then concentrated to a solids content of about 63 wt. % by distilling off water under a pressure of 12 torr and a temperature of 45–48° C. The viscosity of the mixture is 30 sec. when measured in a 4 mm DIN beaker at 20° C. The gelling time was 94 sec. at 100° C. after adding 10 wt. % ammonium chloride hardener, and the water compatibility level is 1:2.1. The resin solution was clear and bright yellow. The mole % ratio of phenol-melamine-acetone was 23:21.8:55.2.

EXAMPLE IV

Wood chipboards were manufactured using the condensation resin solutions of Examples I, II and III, and tested. For comparison purposes, a further test Board "a" was manufactured using a commercially obtainable wood glue, namely a phenol-melamine-urea-formaldehyde condensation resin solution. In addition, a further two three-ply Boards "b" and 4 were manufactured and tested. In Board "b", the middle layer was bonded with the same commercially obtainable condensation resin solution as used for manufacturing Board "a", and in the Board 4, the middle layer was bonded with the condensation resin solution of Example I. The covering layers of Boards a and 4 were pressed with the same phenolic resin solutions, of the usual type for this purpose.

The conditions under which the boards are manufactured are given in Table 1. The test results are shown in Table 2.

TABLE 1

| | |
|---|---|
| Gluing | 11 wt. % resin (dry) relative to the wood quantity (dry) |
| Waterproofing | 1 wt. % paraffin, relative to the wood quantity (dry) |
| Accelerator | 1.2 wt. % ammonium chloride |
| Liquor viscosity | 22 sec. |
| Residual chips moisture | 11.6 wt. % |
| Pressing Temperature | 160°–165° C. |
| Pressing factor | 0.3 min/mm. |

TABLE 1

| Board Bonding Agent | 1 As Ex. I | 2 As Ex. II | 3 As Ex. III | a As state of the art* | b 3-ply boards Middle layer As state of the art | 4 3-ply boards Middle layer As Ex. I |
|---|---|---|---|---|---|---|
| Board thickness (mm) | 16.0 | 15.0 | 15.9 | 16.0 | 15.8 | 16.0 |
| Density (g/cm$^2$) | 0.690 | 0.685 | 0.675 | 0.704 | 0.707 | 0.701 |
| Bonding strength to DIN 52 362 (kp/cm$^2$) | 211 | 205 | 177 | 212 | 263 | 246 |
| Transverse tensile strength V 20 to DIN 52 365 (kp/cm$^2$) | 10.6 | 8.4 | 7.6 | 10.8 | 10.6 | 9.1 |
| Transverse tensile strength V 100 to DIN 52 365 (kp/cm$^2$) | 4.8 | 4.0 | 1.2 | 4.2 | 4.2 | 4.0 |
| Swelling in thickness to 2Std. to DIN 52364 (%) | 3.0 | 3.0 | 3.6 | 3.8 | 4.3 | 4.7 |
| Swelling in thickness to 24Std. to DIN 52364 (%) | 10.3 | 11.0 | 13.2 | 11.4 | 12.5 | 11.3 |

*Commercial melamine-urea-formaldehyde resin

The Table clearly shows that the wood chipboards with the resins according to the invention of Examples I and II (tested in accordance with DIN 58 761) have the required transverse tensile strength V 100 of at least 1.5 kp/cm$^2$.

The Table, however, also shows that the molar ratio of acetone to melamine must not rise above 60 wt. % if weather resistance is still required. Nevertheless, it is surprising that in Example III, with a composition containing phenol, melamine and acetone in a mole % ratio of 23:22:55, V 100 values of about 1.2 are still found, together with quite useful V 20 values of about 7 to 8 (which still lie within the V 20 requirements for transverse tensile strength).

What is surprising is that the melamine-acetone system, which in itself is not boil-proof, produces in combination with phenolic resin a bonding agent for weatherproof wood materials, and wherein proportions of 10-40 mole % of phenol, relative to the mole % of phenol+acetone+melamine are desirable in order to satisfy the requirements of DIN Specifications 68 765 for weather proof wood materials.

We claim:

1. A process for preparing bonding agents for light-colored weatherproof wood materials based on alkali-condensed phenol-formaldehyde mixed condenstates comprising first preparing a resin solution A by condensing phenol and formaldehyde in a molar ratio of 1:1.5 to 2.5 in the presence of from 0.1 to 1 moles of alkali, relative to phenol, to a viscosity of between 10 and 20 sec. when measured in a 4 mm DIN beaker at 20% and to a solids content of 45-50 wt. %, and preparing a resin solution B by condensing acetone and formaldehyde in a molar ratio of 1:3 to 5 in the presence of 0.01-0.15 moles of alkali, relative to acetone, then adding melamine portion-wise to the acetone-formaldehyde precondensate to a total melamine quantity such that the molar ratio of melamine to acetone lies in the range of 1:1 to 2.5, and condensing to a viscosity of 10-20 sec. when measured in a 4 mm DIN beaker at 20° C. and at a solids content of 45-50 wt. %, then mixing the resin solutions A and B wherein the phenol content of the mixture, relative to phenol plus melamine plus acetone is 10-40 mole % and condensing the mixture for 20-60 minutes at 70-90° C. followed by concentrating the mixture at about 10-20 torr. pressure to a solids content of 60-65 wt. % and a viscosity of 20-100 sec. when measured in a 4 mm DIN beaker at 20° C.

2. A process as claimed in claim 1, wherein in preparing resin solution B, the melamine is added portion-wise to an acetone-formaldehyde precondensate at a temperature of between 70-90° C. and a pH of between about 7.5 and 8, and condensation is effected at this temperature to a water compatibility level of at least 1:2 while adjusting the pH to between 8 and 9 by adding alkali.

3. A process as claimed in claim 1 wherein resin solution B is condensed after adding the melamine in an acid range of a pH between 6 and 6.5 to a water compatibility level of at least 1:2, and then adjusting the pH to between 8 and 9 by adding alkali after cooling.

4. The bonding agent prepared by the process of claim 1.

5. The bonding agent prepared by the process of claim 2.

6. The bonding agent prepared by the process of claim 3.

* * * * *